(12) United States Patent
Donabedian et al.

(10) Patent No.: US 10,011,304 B1
(45) Date of Patent: Jul. 3, 2018

(54) LOCALIZED ROCKER REINFORCEMENT INSERT

(71) Applicant: Ford Global Technologies, LLC, Dearborn, MI (US)

(72) Inventors: Edgar Edward Donabedian, Livonia, MI (US); Leonard Anthony Shaner, New Baltimore, MI (US); Darrin Neil Wagner, Bloomfield Hills, MI (US); Yu-Kan Hu, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/608,389

(22) Filed: May 30, 2017

(51) Int. Cl.
*B62D 25/02* (2006.01)
*B62D 25/20* (2006.01)
*B60R 13/04* (2006.01)

(52) U.S. Cl.
CPC ....... *B62D 25/025* (2013.01); *B62D 25/2036* (2013.01); *B60R 13/04* (2013.01)

(58) Field of Classification Search
CPC .......................... B62D 25/025; B62D 25/2036

USPC ............................................ 296/209, 187.12
See application file for complete search history.

(56) References Cited

U.S. PATENT DOCUMENTS

| | | | | |
|---|---|---|---|---|
| 6,096,403 | A * | 8/2000 | Wycech | B29C 44/1228 296/146.6 |
| 8,113,572 | B2 | 2/2012 | Mildner et al. | |
| 9,079,615 | B2 | 7/2015 | Belpaire et al. | |
| 9,090,290 | B2 * | 7/2015 | Kellner | B62D 29/008 |
| 9,327,666 | B2 | 5/2016 | Sassi et al. | |
| 9,555,840 | B2 * | 1/2017 | Belpaire | B62D 29/002 |

* cited by examiner

*Primary Examiner* — Dennis H Pedder
(74) *Attorney, Agent, or Firm* — Jason Rogers; Brooks Kushman, P.C.

(57) ABSTRACT

A vehicle rocker assembly is provided. The vehicle rocker assembly may include an outer panel, a side sill, and an insert. The side sill may define at least two cavities with the outer panel. The insert may be disposed in the cavities. The insert may include a longitudinally extending U-shaped carrier and a plurality of reinforcement members attached to the U-shape carrier. The plurality of reinforcement members may be spaced apart from a bottom of the U-shaped carrier by a predetermined distance.

20 Claims, 5 Drawing Sheets

US 10,011,304 B1

LOCALIZED ROCKER REINFORCEMENT INSERT

TECHNICAL FIELD

This disclosure relates to a rocker assembly for a vehicle including an insert attached to a carrier that reduces deflection in a localized area in a side pole impact.

BACKGROUND

Rocker assemblies are provided between the front and rear wheel wells and below the doors of a vehicle to provide resistance to intrusion into the passenger compartment in side impact collisions. Rocker assemblies may include an outer rocker panel that is joined to a side sill. Various reinforcements have been proposed to strengthen rocker assemblies. Rocker assemblies are often comprised of extruded or stamped metal having a uniform cross section throughout the length of the rocker assembly. Pole impact testing, as outlined in the Federal Motor Vehicle Safety Standards (FMVSS) 214 and the Euro NCAP standards, require crashing the side of a vehicle into a pole in a predetermined location, thus requiring a reinforcement in only certain locations.

SUMMARY

According to one aspect of this disclosure, a vehicle rocker assembly is provided. The vehicle rocker assembly may include an outer panel, a side sill, and an insert. The side sill may define at least two cavities with the outer panel. The insert may be disposed in the cavities. The insert may include a longitudinally extending U-shaped carrier and a plurality of reinforcement members attached to the U-shape carrier. The plurality of reinforcement members may be spaced apart from a bottom of the U-shaped carrier by a predetermined distance.

According to another aspect of this disclosure, a vehicle rocker assembly is provided. The rocker assembly may include an outer panel, a side sill and a reinforcement. The side sill may define three cavities with the outer panel. The reinforcement may be disposed within the cavities and may include a U-shaped carrier that includes a first, second and third longitudinally extending arms and a reinforcement member. The reinforcement member may be attached to the longitudinally extending arms and spaced apart from a connecting portion of the U-shaped carrier to position the reinforcement member in a predetermined location.

According to yet another aspect of this disclosure, a method is provided. The method may include assembling a reinforcement including a U-shaped carrier having a first arm and reinforcement block extending from one side of the U-shaped carrier and second and third arms each having a reinforcement block extend from another side of the carrier wherein the first side is inserted to one side of an internal wall defined by an outer panel and sill of a rocker assembly and wherein the second side is inserted into a side opposite the first

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
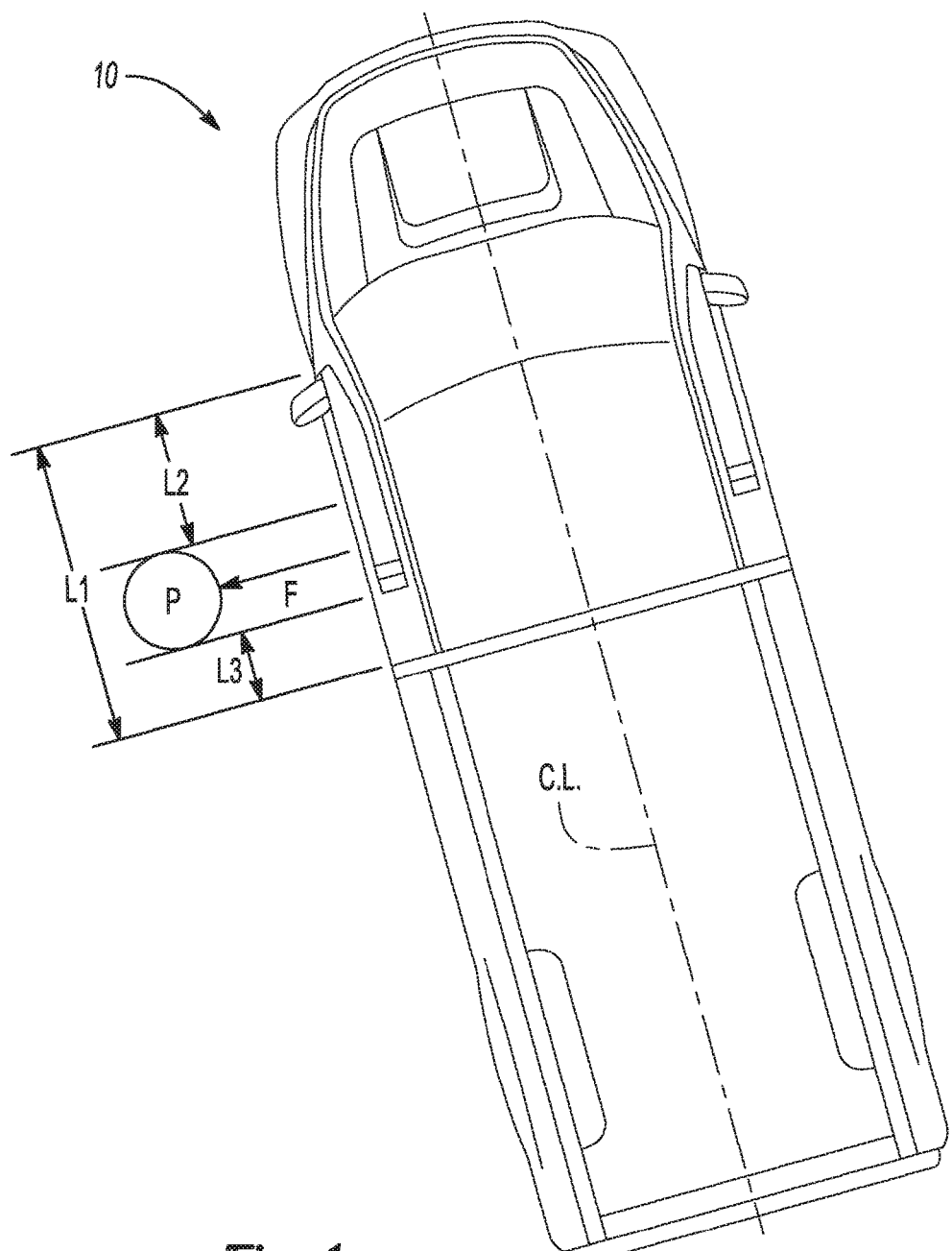
FIG. 1 is an illustration of a top view of an example side impact test.

Referring to FIG. 1, a top view of a side-impact poll test is illustrated. In this test, vehicle 10 is displaced along the directional arrow F until the vehicle impacts the pole P. The angle between the pole and the vehicle centerline C.L. is approximately 75° and the vehicle speed is approximately 32.2 km/h. The test illustrated is very similar to the outlined by the National Highway Traffic Safety Association in FMVSS 214. While test FMVSS 214 is shown, the reinforcement assembly, discussed below, may be suitable for increasing vehicle performance in other side impact or side pole tests.

The rocker panel and the vehicle door absorb a large portion of the load exerted by the pole during the impact. Because only a portion of the rocker panel assembly meets the pole, the size and location of a rocker reinforcement may be specified to improve the structural integrity of the rocker panel of the test. The rocker panel assembly has a length L1 that extends between the front fender and the B-Pillar of the vehicle. L2 represents the distance between the front of the rocker panel assembly and the front edge of the reinforcement member. L3 represents the distance between the rear of the rocker panel assembly and the rear edge of the reinforcement member. Therefore, the length of the reinforcement member is the summation of L2 and L3 subtracted from L1.

Referring to FIGS. 2A-2B, partial perspective views of the rocker panel assembly 14 are illustrated. The rocker panel assembly 14 may longitudinally extend between the front fender and the B-Pillar 26. The rocker assembly 14 is vertically positioned below the vehicle doors (not shown). As stated in FIG. 1, the rocker panel assembly 14 has a linear distance of L1. The rocker panel assembly 14 may be comprised of an outer panel 16 and a sill 17. The outer panel 16 and the sill 17 each extend along the length L1 of the vehicle 10.

The outer panel 16 and sill 17 each include vertically extending walls 16a and 17a respectively that are joined or attached to one another. The outer panel 16 may include an outboard wall 16b that extends from a top portion of the vertically extending wall to a bottom portion of the vertically extending wall 16a to define a cavity. The sill 17 may include an inboard wall 17b that extends from a top portion of the vertically extending wall 17a to a bottom portion of the vertically extending wall 17a to define a cavity. A transverse wall member 17c may extend between the inboard wall 17b to the vertically extending wall 17a of the sill so that a second and third cavity may be defined. While three cavities 15a, 15b, and 15c are described and illustrated, fewer or more cavities may be defined by the sill 17 and the outer panel 16.

The outer panel 16 and the sill 17 may be made from various metallic materials including steel, aluminum or other suitable alloys. The outer panel 16 and the sill 17 may be produced by various manufacturing process including but not limited to casting, extrusion, and joining a number metal stampings by welding or some other suitable fastening means. Generally, localized reinforcement of a structural member, like the rocker panel assembly discussed, requires an increased cross-sectional thickness in the localized reinforced area. Because the process of extrusion of and metal stamping produce components or parts that have a generally uniform thickness, these processes may not be conducive for creating a rocker panel assembly with a localized reinforcement. Moreover, a rocker panel assembly having a constant cross-section that can withstand the force of the side impact test, a significant weight penalty may be incurred.

A rocker reinforcement assembly 11 is shown disposed within the rocker panel assembly 14. The rocker reinforcement assembly 15 includes a U-shaped carrier 18 and reinforcement blocks 20a, 20b, and 20c attached thereto. The U-shaped carrier 18 may have two arms that extend from the connecting portion or proximal end of the U-shaped carrier 18 to a distal end of the U-shaped carrier 18. The U-shaped carrier 18 may have a planar shape that extends longitudinally along the rocker panel assembly. Moreover, the carrier 18 may be made from a lightweight semi flexible metallic material, including but not limited to aluminum, spring steel or some other suitable ferrous material. In other embodiments, the U-shaped carrier may be made from a plastic or other polymeric material.

The U-shaped carrier 18 may include a locating notch 19 disposed near the connecting portion or proximal end of the U-shaped carrier 18. The locating notch 19 may be used to vertically situate or place the U-shaped carrier 19 within the rocker panel assembly 14. For example, the locating notch 19 may engage the transverse wall member 17c that extends between the outboard wall of the sill and the vertically extending wall 17a of the sill 17. The connecting or proximal portion of the carrier may be pressed flush against the vertically extending walls 16a 17a and or the transverse wall member 17c. Placing the proximal or connecting portion against the vertically extending wall may longitudinally position the reinforcement blocks 20a, 20b, and 20c in the desired design position within the rocker panel assembly 14.

Reinforcement blocks 20a, 20b, and 20c are attached to the U-shaped carrier and are disposed within cavities 15a, 15b, and 15c, respectively. The reinforcement blocks may have a polygonal shape that closely resembles the internal walls of the outer panel 16 and the sill 17. The reinforcement blocks 20a, 20b, and 20c may have a length of $L_R$, and may be spaced apart from the rear of the rocker panel assembly by a distance L3 and from the front of the rocker panel assembly L2. The reinforcement blocks 20a, 20b, and 20c may be made of various polymeric materials having suitable strength for reinforcing the rocker panel assembly 14. The reinforcement blocks 20a, 20b, and 20c may include a number of structural adhesive strips 22a, 22b, and 22c may disposed on the outer portions of the reinforcement blocks. The structural adhesive may be configured to bond to the internal walls of the outer panel 16 and the sill 17.

Figure 3:
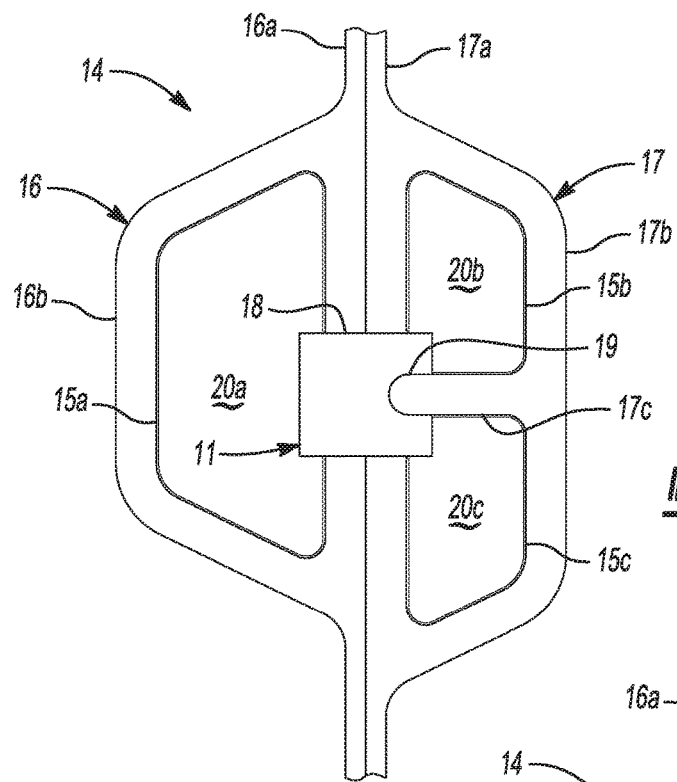
FIG. 3 is a front view of a vehicle rocker assembly including a rocker reinforcement assembly.

Referring to FIG. 3, a front view of the rocker panel assembly 14 including the reinforcement assembly 11 is illustrated. As was mentioned, above rocker panel assembly 14 includes an outer panel 16 and a sill 17 connected by vertical walls 16a 17a of the outer panel 16 and the sill 17. The first reinforcement member 20a, second reinforcement member 20b, and third reinforcement member 20c may nest within the first, second, and third cavities 15a, 15b, and 15c, respectively, as defined by the outer panel 16 and the sill 17. Nest means to be disposed within and/or adjacent to the surrounding walls of outer panel 16 and the sill 17. While the reinforcement member is shown nearly line to line with the walls of the cavities, in other configurations, the reinforcement member may not contact the walls of the cavities.

In the first cavity 15a, the U-shaped carrier 18 is positioned between the inboard wall 16b and the vertically extending wall 16a of the outer panel. In the second and third cavities 15b and 15c, the U-shaped carrier 18 is positioned between the outboard wall 17b and the vertically extending wall 17a of the sill. The proximal or connecting portion may be engaged with the vertically extending walls 16a 17a and the transverse wall member 17c of the sill 17.

Figure 2:
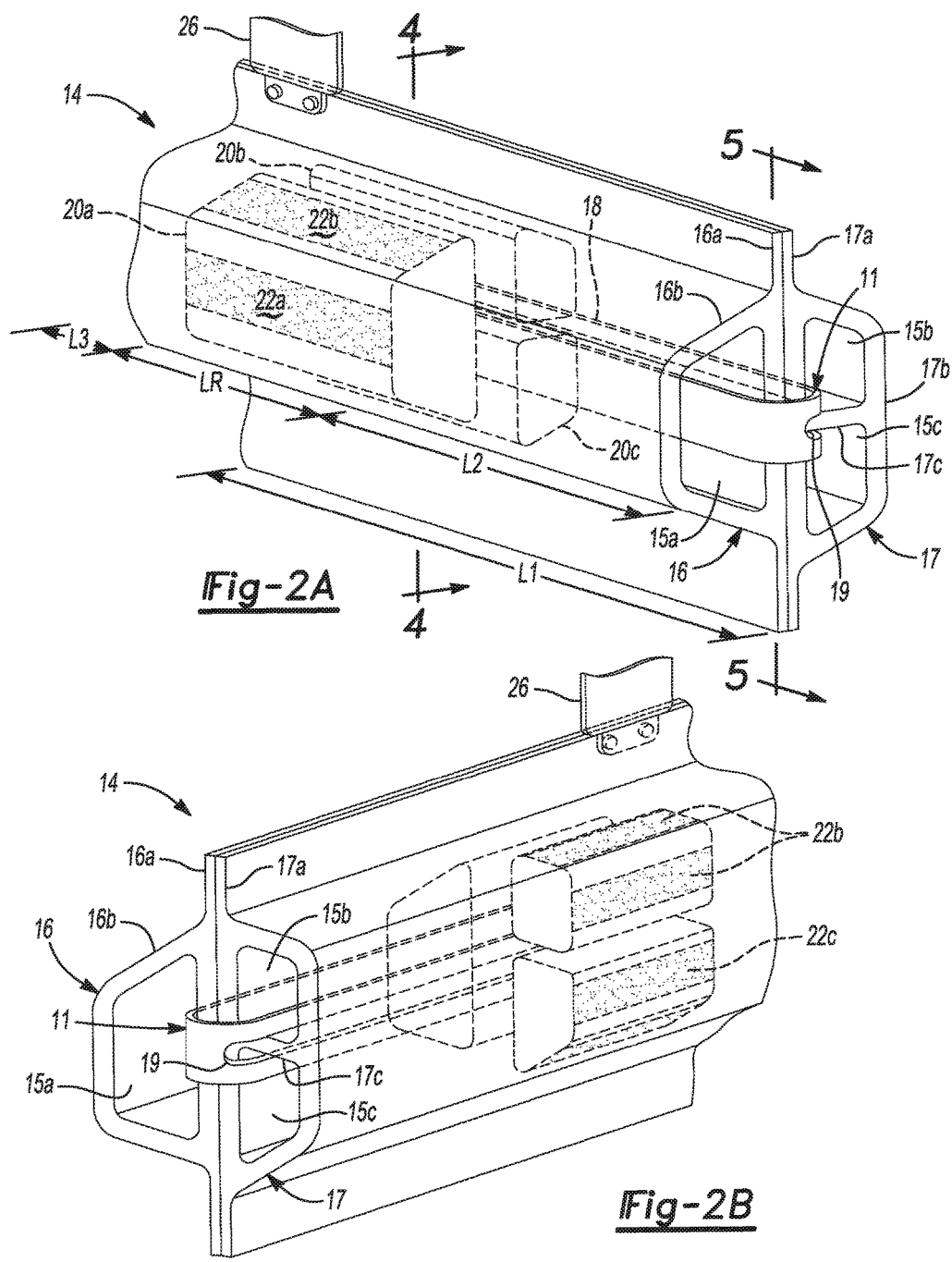
FIGS. 2A-2B are perspective views of a vehicle rocker assembly including a rocker reinforcement assembly.
Figure 4:
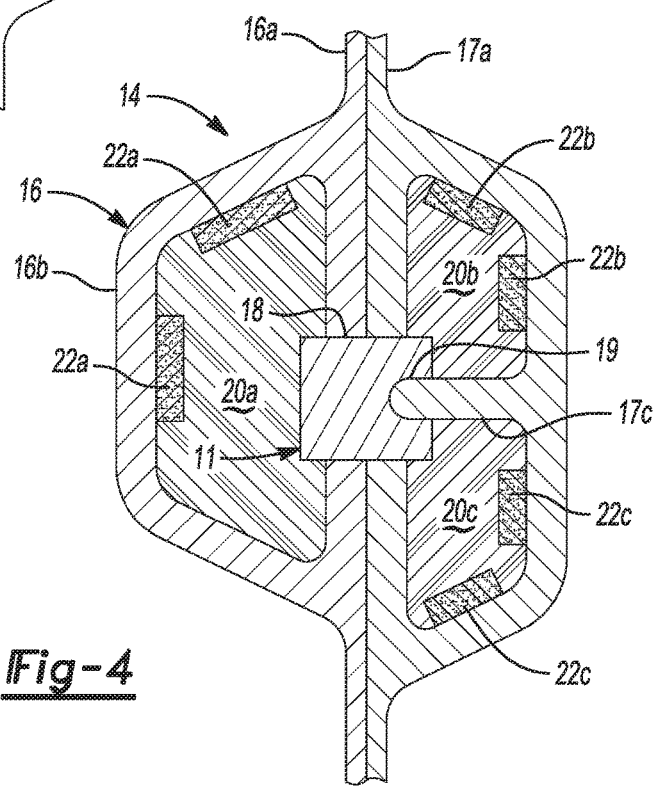
FIG. 4 is a cross sectional view of a vehicle rocker assembly including a rocker reinforcement assembly taken along the lines 4-4.

Referring to FIG. 4, a cross-sectional view of the rocker assembly including the rocker enforcement taken along the lines 4-4 of FIG. 2, is illustrated. The walls of the outer panel 16 and the sill 17 generally have a uniform cross-sectional thickness as those illustrated in FIG. 3. Structural adhesive strips 22a, 22b, and 22c are disposed on the outer portions of the reinforcement blocks 20a, 20b, and 20c are engaged with the walls of the outer panel 16 and the sill 17 including heating in a painting oven.

Figure 5:
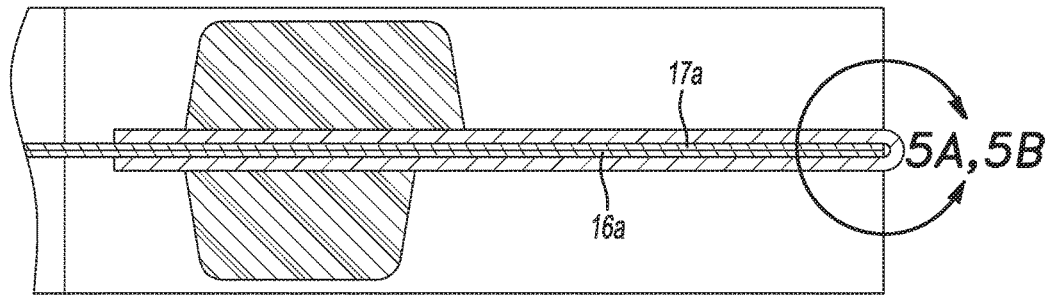
FIG. 5 is a cross sectional view of a vehicle rocker assembly including a rocker reinforcement assembly taken along the lines 5-5.

Referring to FIG. 5, a cross-sectional view of the rocker panel assembly 14 and the rocker reinforcement assembly 11 taken along the lines 5-5 of FIG. 2, is illustrated. As already mentioned, the connecting portion or proximal portion of the carrier 18 may be pressed flush against the vertically extending walls 16a 17a and/or the transverse wall member 17c. Placing the proximal or connecting portion against the vertically extending walls 16a 17a may longitudinally position the reinforcement blocks in the desired design position within the rocker panel assembly.

Figure 5A:
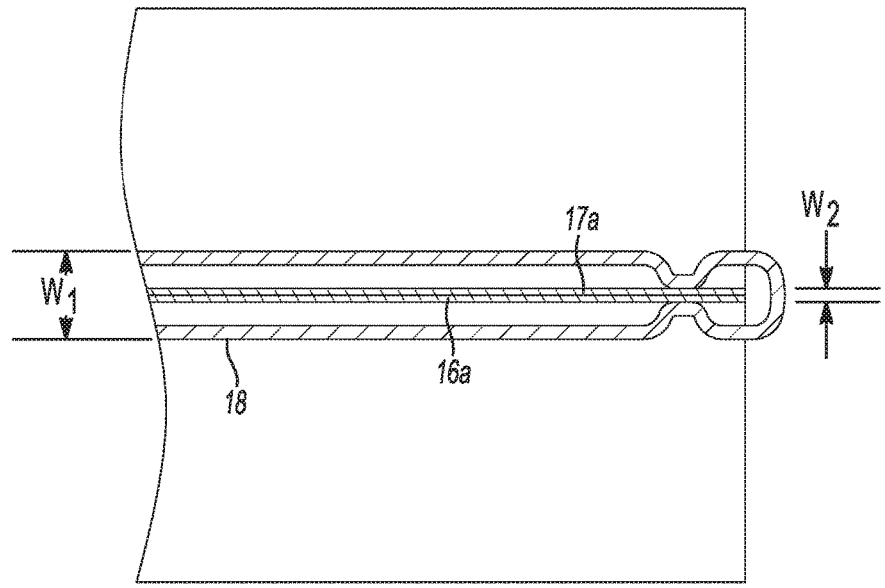
FIGS. 5A-5B are detailed views of a portion of a vehicle rocker assembly including a rocker reinforcement.

Referring to FIG. 5A a detailed view of the U-shaped carrier 18 within the rocker panel assembly 14. The distal ends of the arms of the carrier 18 are spaced apart by a distance $W_1$ and the proximal or connecting portion of the arms of the U-shaped carrier are spaced apart by a distance. The arms have a narrowed section disposed between the distal end and the connecting or proximal end. The arms of the narrowed section are spaced apart by a distance $W_2$. The narrowed section may engage the vertically extending walls 16a 17a of the outer panel 16 and the sill 17 so that the reinforcement is held in position.

Figure 5B:
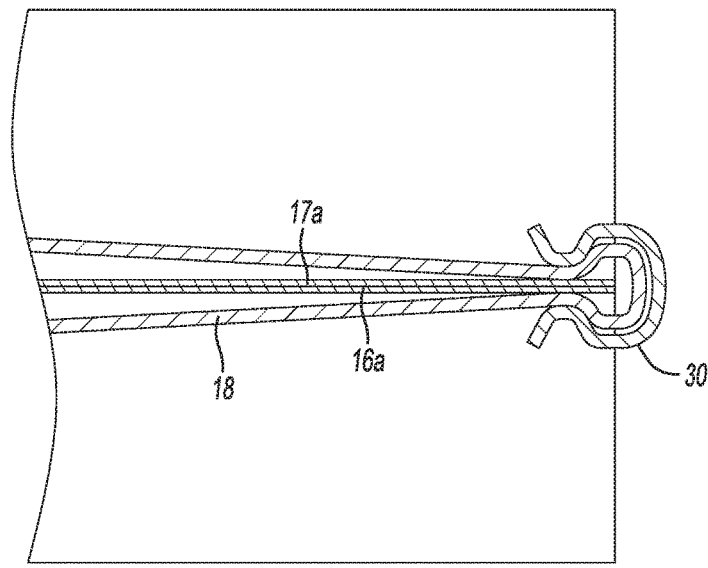

Referring to FIG. 5B, a detailed view of the U-shaped carrier 18 within the rocker panel assembly 14 according to another embodiment, is illustrated. A spring clip 30 is connected to an inner portion of the proximal or connecting portion of the U-shaped carrier 18. The spring clip 30 may be biased so that it engages the vertically extending walls 16a 17a of the outer panel 16 and sill 17 so that the reinforcement 11 is held in place. While the spring clip 30 is positioned within the U-shaped carrier 18, in other embodiments, the spring clip 30 may be disposed on the outer portion of the U-shaped carrier 18.

Figure 6:
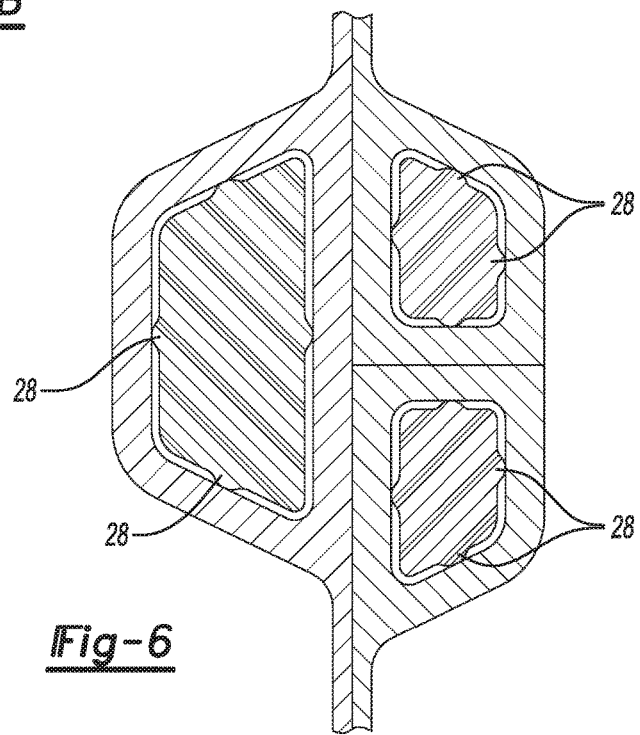
FIG. 6 is a cross-sectional view of a vehicle rocker assembly including a rocker reinforcement assembly, taken along the lines 4-4.

Referring to FIG. 6, a cross sectional view taken along the lines 4-4 is illustrated. Like the rocker panel assembly 14 and reinforcement assembly 11 described in FIG. 4, the reinforcement assembly 11 is disposed with the three cavities 15a 15b and 15c. But in lieu of the adhesive strips 22a, 22b, and 22c or in combination with the adhesive strips 22a, 22b, and 22c, the reinforcement blocks or members 20a, 20b, and 20c include several protrusions or nubs 28 that may engage with the walls defined by the outer panel 16 and sill 17. The protrusions or nubs 28 may be made from the same or similar material as the reinforcement blocks or members. Moreover, the protrusions 28 may deform or deflect inwardly as the reinforcement assembly 11 and reinforcement blocks or members 20a, 20b, and 20c are inserted into the rocker panel assembly 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle rocker assembly comprising:
an outer panel;
a side sill defining at least two cavities with the outer panel; and
an insert disposed in the cavities that includes
a longitudinally extending U-shaped carrier, and
a plurality of reinforcement members attached to the U-shape carrier, wherein the plurality of reinforcement members is spaced apart from a connecting portion of the U-shaped carrier by a predetermined distance to locally reinforce the rocker assembly.

2. The vehicle rocker assembly of claim 1, wherein the U-shaped carrier defines a locating notch that engages a portion of the side sill and a portion of the outer panel so that the plurality of reinforcement members are disposed between a front end and a rear end of the rocker assembly.

3. The vehicle rocker assembly of claim 2, wherein the locating notch engages a portion of the side sill and a portion of the outer panel so that the U-shaped carrier is spaced apart from a bottom of the rocker assembly by a vertical predetermined distance to locally reinforce the rocker assembly.

4. The vehicle rocker assembly of claim 1, wherein the outer panel defines a cavity and the side sill defines two cavities divided by a middle wall.

5. The vehicle rocker assembly of claim 4, wherein the longitudinally extending U-shaped carrier includes a first arm and a second arm, wherein the second arm includes a first portion and a second portion that are spaced apart from one another.

6. The vehicle rocker assembly of claim 1, wherein respective ones of the plurality of reinforcement members are adhesively connected to an inner surface of the outer panel and an inner surface of the side sill.

7. The vehicle rocker assembly of claim 1, wherein the plurality of reinforcement members further define a plurality of deformable protrusions that engage walls defined by the outer panel and the side sill.

8. The vehicle rocker assembly of claim 1, further comprising a spring clip connected to the carrier wherein the spring clip engages a portion of the outer panel and the side sill to hold the insert in place.

9. A vehicle rocker assembly comprising:
an outer panel;
a side sill defining three cavities with the outer panel; and
a reinforcement disposed in the cavities that includes
a U-shaped carrier including first, second, and third longitudinally extending arms, and
a reinforcement member attached to the longitudinally extending arms and spaced apart from a connecting portion of the U-shaped carrier to position the reinforcement member in a predetermined location.

10. The vehicle rocker assembly of claim 9, wherein the outer panel defines a first cavity and the side sill includes a transverse wall that defines second and third cavities, wherein the first, second, third cavities each include a longitudinally extending arm and a longitudinally extending reinforcement member.

11. The vehicle rocker assembly of claim 9, wherein respective ones of the reinforcement members are adhesively connected to an inner surface of the outer panel and an inner surface of the side sill.

12. The vehicle rocker assembly of claim 9, wherein the U-shaped carrier has a proximal end and a distal end, wherein near the distal end, the first longitudinally extending arm is spaced apart from the second and third longitudinally extending arms by a first distance, and wherein near the proximal end, the first arm is spaced apart from the second and third arms by a second distance, less than the first.

13. The vehicle rocker assembly of claim 9, further comprising a spring clip connected to the U-shaped carrier, wherein the spring clip engages a portion of the outer panel and a portion of the side sill to hold the reinforcement in place.

14. The vehicle rocker assembly of claim 9, wherein the longitudinally extending reinforcement member includes plural deformable protrusions that outwardly extend from the longitudinally extending reinforcement member and are configured to engage at least one wall of the cavities.

15. A method comprising:
assembling a reinforcement including a U-shaped carrier having a first arm and reinforcement block extending from a first side of the U-shaped carrier and second and third arms each having a reinforcement block extending from a second side of the carrier, wherein the first side is inserted into one side of an internal wall defined by an outer panel and sill of a rocker assembly and wherein the second side is inserted into a side opposite the first.

16. The method of claim 15, further comprising inserting the reinforcement into the rocker assembly so that a bottom portion of the U-shaped carrier bottoms out on the internal wall defined by the rocker assembly so that the reinforcement blocks are longitudinally positioned in a predetermined location.

17. The method of claim 16, further comprising deforming a plurality of deformable protrusions outwardly extending from the reinforcement block as the plurality of deformable protrusions contact a plurality of internal walls of the rocker assembly.

18. The method of claim 15, inserting a spring clip onto a portion of the U-shaped carrier so that the spring clip biases the U-shaped carrier inwardly against a portion of the internal wall so that the U-shaped carrier is held in place.

19. The method of claim 15, further comprising heating a structural adhesive disposed on the reinforcement blocks so that the reinforcement is fixed to the rocker assembly.

20. The method of claim 19, wherein the heating step is accomplished by inserting the reinforcement into an electrophoretic painting oven.

* * * * *